United States Patent [19]

Solo

[11] Patent Number: 5,379,491
[45] Date of Patent: * Jan. 10, 1995

[54] MOUNTING MEANS FOR REMOVABLY SECURING FUNCTIONAL ITEMS TO SUPPORT ARTICLES

[76] Inventor: Alan J. Solo, 1835 Burnett St., Brooklyn, N.Y. 11229

[*] Notice: The portion of the term of this patent subsequent to Jul. 14, 2009 has been disclaimed.

[21] Appl. No.: 989,376

[22] Filed: Dec. 11, 1992

[51] Int. Cl.$^6$ .............................................. A44B 21/00
[52] U.S. Cl. ....................................... 24/3 R; 24/3 J; 24/10 R; 24/306
[58] Field of Search ................. 24/3 R, 3 A, 3 F, 3 J, 24/3 M, 5, 6, 7, 8, 10 R, 11 R, 11 F, 11 M, 306, 335, 336, 339, 487

[56] References Cited

U.S. PATENT DOCUMENTS

| | | | |
|---|---|---|---|
| 2,907,085 | 10/1959 | Bosland | 24/10 R |
| 3,235,926 | 2/1966 | Mates | 24/306 |
| 3,374,508 | 3/1968 | Slimovitz | 24/3 R |
| 3,387,341 | 6/1968 | Mates et al. | 24/306 |
| 3,398,439 | 8/1968 | Fried et al. | 24/7 |
| 3,978,591 | 9/1976 | Jaaskelainen | 24/3 R X |
| 4,327,837 | 5/1982 | Ross | 24/306 R X |
| 4,406,040 | 9/1983 | Cannone | 24 3 J/ |

*Primary Examiner*—Laurie K. Cranmer
*Attorney, Agent, or Firm*—Goodman & Teitelbaum

[57] ABSTRACT

A mounting member for removably securing conventional items, such as flip up and down glasses, compasses, pedometers, pouches, purses, cases, clips, holding members, flashlights or pen lights, and watches to support articles, such as baseball caps, head sweat bands, clothing, footwear, parts of a person's body, posts, steps, and moldings where the support articles have convex, concave or stepped surfaces, the mounting member being provided with transverse hinges between sections thereof to permit the sections to pivot both upwardly and downwardly relative to each other so that the mounting member can be positioned on a curved article, where the hinges can have flexible accordian-like portions to permit the sections to pivot or swing transversely from side to side relative to each other to provide a curved arrangement. One of the sections can include an adjustment member to position the flip up and down glasses relative to a wearer's eyes. The item can be formed integrally on one section or can be removably secured thereto by Velcro fasteners, snap fasteners, suction members or a double sided adhesive tape. The mounting member can be removably secured to the support article by any one of the above mentioned fasteners. In one embodiment, a fastener on an upper surface of one end section is secured to a fastener on a lower surface of an opposite end section so that the mounting member is disposed around the support article. The mounting member can be provided with numerous sections integrally connected together by the hinges.

21 Claims, 7 Drawing Sheets

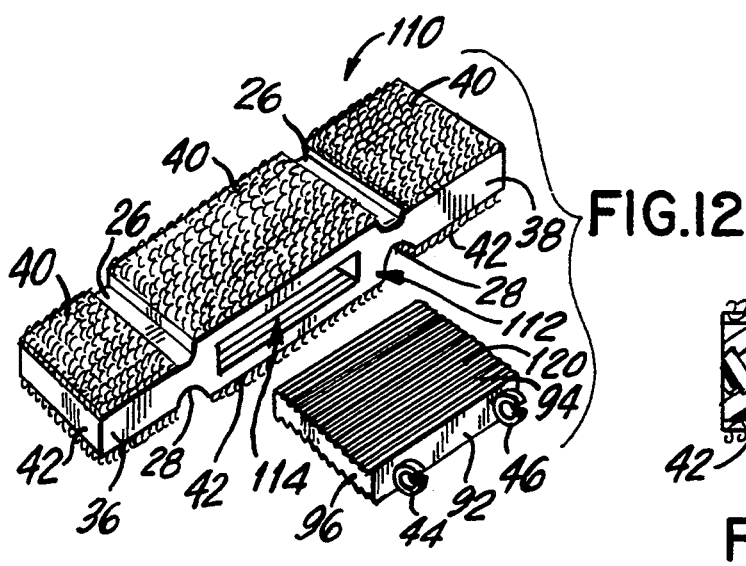
FIG.12
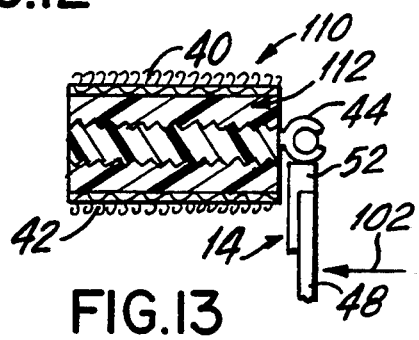
FIG.13
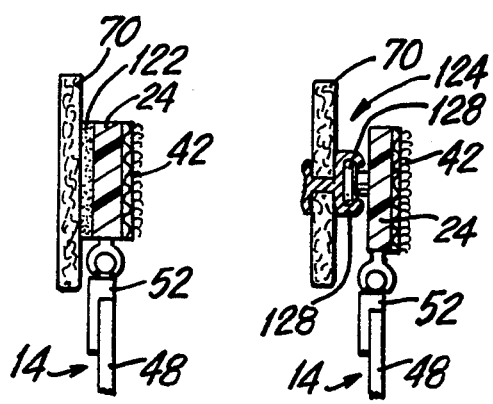
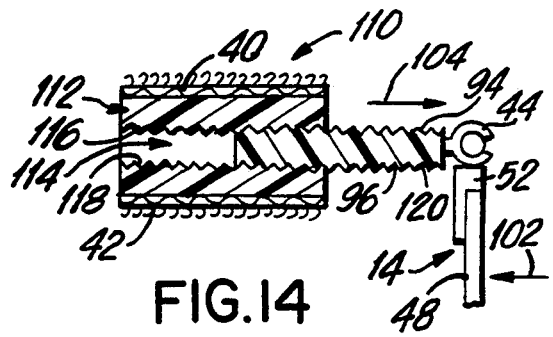
FIG.14
FIG.15  FIG.16
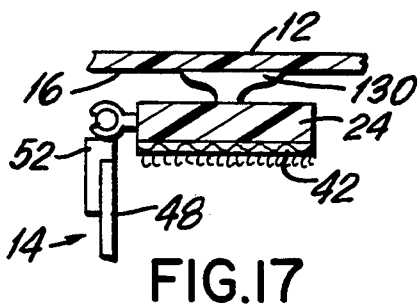
FIG.17
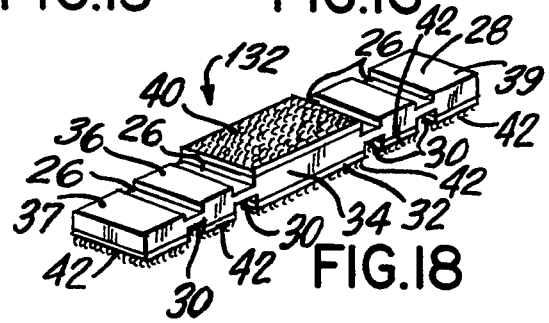
FIG.18
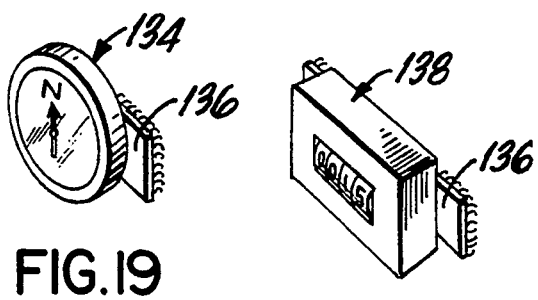
FIG.19    FIG.20
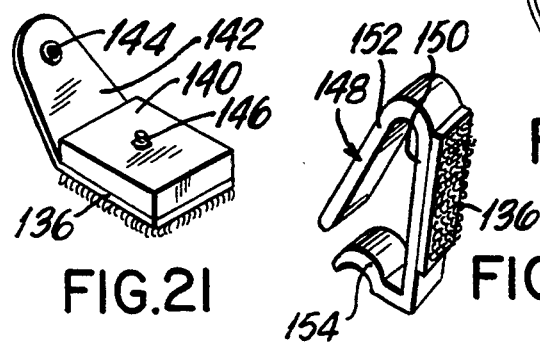
FIG.21    FIG.22

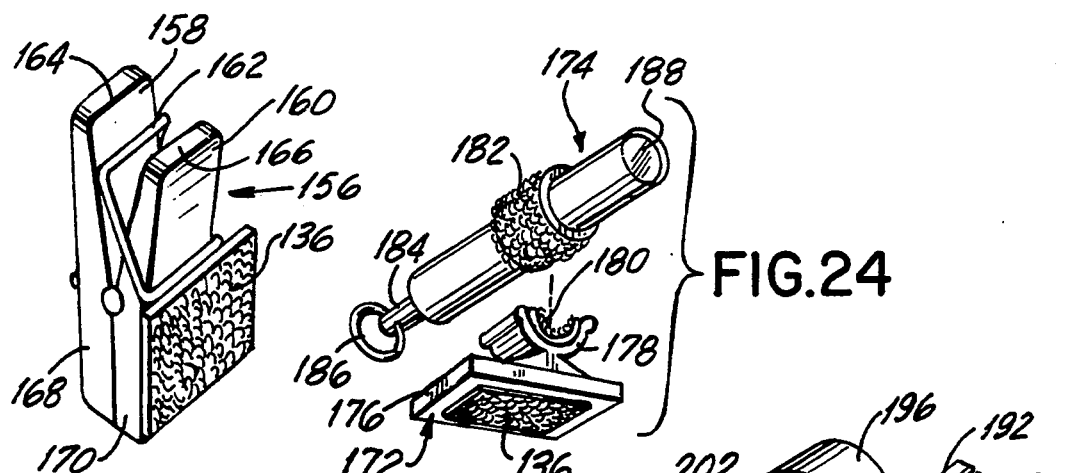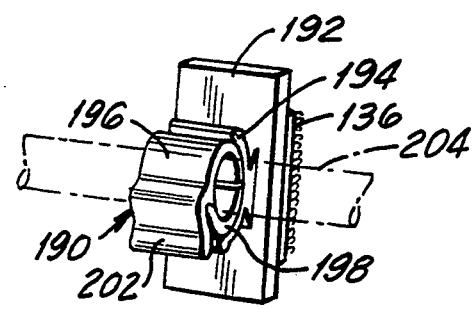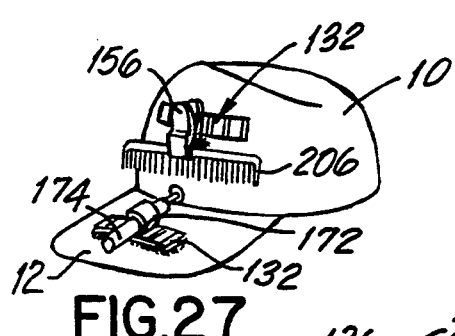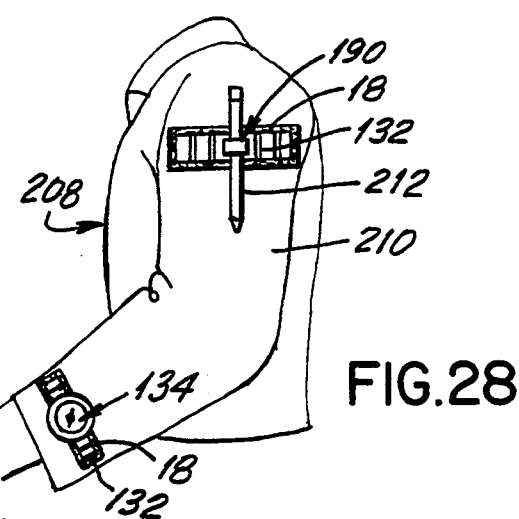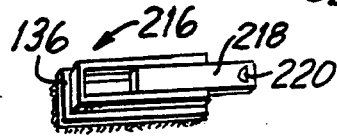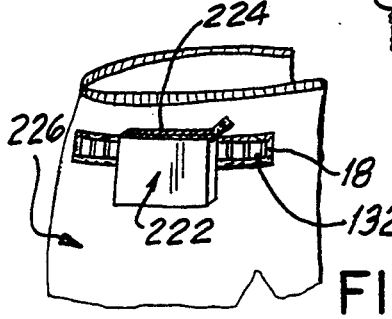

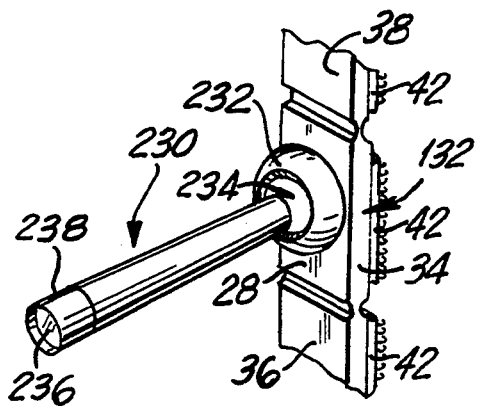
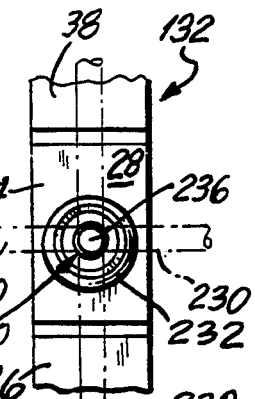
FIG.32　　FIG.33　　FIG.34
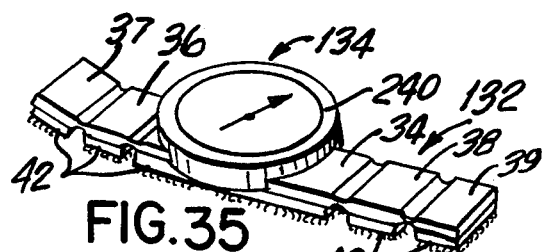
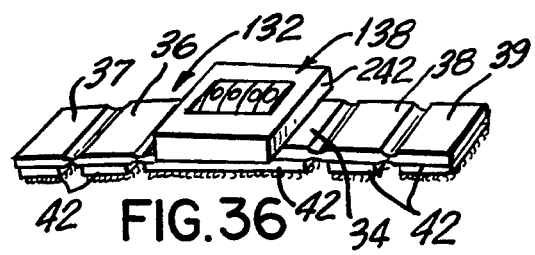
FIG.35　　FIG.36
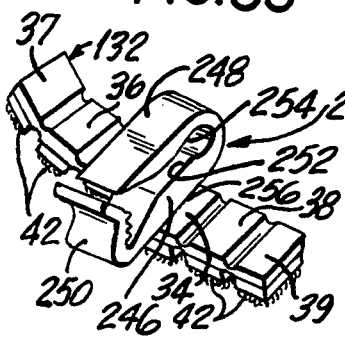
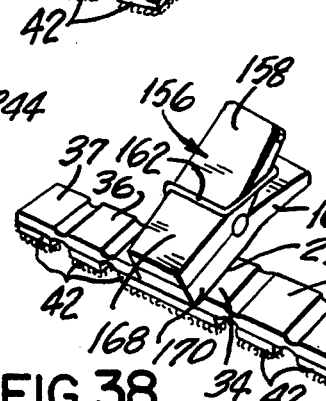
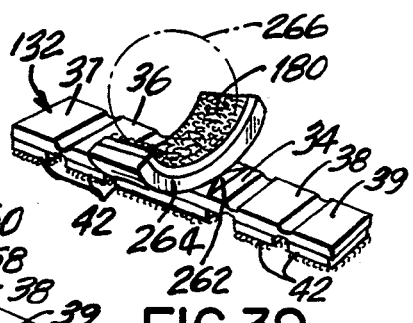
FIG.37　　FIG.38　　FIG.39
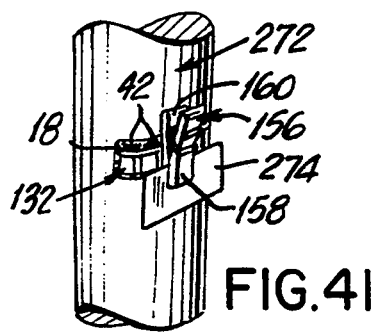
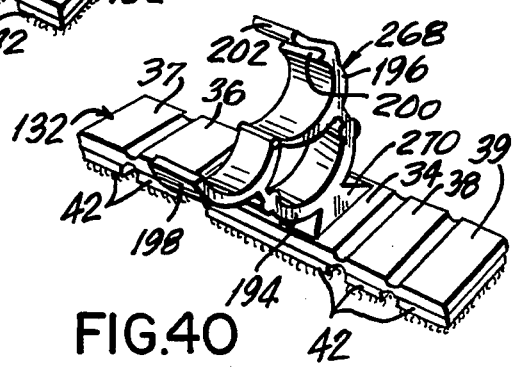
FIG.41　　FIG.40

MOUNTING MEANS FOR REMOVABLY SECURING FUNCTIONAL ITEMS TO SUPPORT ARTICLES

BACKGROUND OF THE INVENTION

The invention relates to mounting means and, more particularly, to a mounting member for removably securing conventional items, such as flip up and down glasses, compasses, pedometers, pouches, purses, cases, clip means, holding means, flashlights or pen lights, watches and the like, to support articles, such as baseball caps, head sweat bands, clothing, footwear, parts of a person's body, posts, steps, moldings and the like, where the support articles have convex, concave or stepped surfaces, the mounting member being provided with hinge means to permit sections thereof to pivot both upwardly and downwardly relative to each other so that the mounting member can be positioned on a curved article, where the hinge means can have flexible accordian-like portions to permit the sections to pivot or swing transversely from side to side relative to each other to provide a curved arrangement.

There are many occasions when a person requires attachment means to removably secure a functional item, such as mentioned above, to a support article, such as mentioned above. However, the prior art attachment means are usually rigid members, and therefore do not conform to a curved or stepped surface of the support article to which it may be secured, and therefore a secured engagement is not provided therebetween, where after a period of time, the attachment means is usually separated from the support article.

The Applicant's U.S. Pat. No. 5,129,102 discloses a mounting member for securing a pair of flip up and down glasses to the visor of a baseball cap. Even though the mounting member is provided with hinge means, the particular structure thereof is limited to the specific attachment of the flip up and down glasses to the visor of the baseball cap, and therefore is not adapted to secure other types of conventional items to other types of support articles.

Therefore, the prior art mounting or attachment members are not particularly directed to removably securing different types of conventional items to different types of support articles. Accordingly, there is a need for mounting means which can removably secure different types of conventional items to various support articles having curved or stepped surfaces.

SUMMARY OF THE INVENTION

It is accordingly an object of the present invention to provide mounting means for removably securing conventional items to support items, which avoids the problems of the prior art devices.

Another object of the present invention is to provide mounting means for removably securing conventional items thereto, such as flip up and down glasses, compasses, pedometers, pouches, purses, cases, clips, holding members, flashlights or pen lights, watches and the like.

A further object of the present invention is to provide mounting means having conventional items formed integrally on at least one section thereof, such as compasses, pedometers, pouches, purses, cases, clips, holding members, flashlights or pen lights, watches, and the like.

Still another object of the present invention is to provide holding means as described above, where the item includes a socket portion integrally secured to one section of the mounting means for receiving a ball on one end of a flashlight to provide a universal joint for pivoting the flashlight up, down and sideways relative to the mounting means.

Another object of the present invention is to provide mounting means as described above, which can be removably secured to support articles, such as baseball caps, head sweat bands, clothing, footwear, parts of a person's body, posts, steps, moldings and the like, where the support articles have convex, concave or stepped surfaces.

A further object of the present invention is to provide mounting means as described above, which includes hinge means transversely disposed between each of the sections of the mounting means to permit the sections thereof to pivot both upwardly and downwardly relative to each other so that the mounting means can be positioned on a curved article.

A further object of the present invention is to provide mounting means as described above, where the hinge means can have flexible accordian-like portions to permit the sections to pivot or swing transversely from side to side relative to each other to provide a curved arrangement.

Yet another object of the present invention is to provide mounting means as described above, where one of the sections includes an adjustment member to position the flip up and down glasses relative to a wearer's eyes.

Still another object of the present invention is to provide mounting means as described above, where the items can be removably secured thereto by Velcro fasteners, snap fasteners, suction members or a double sided adhesive tape.

Yet another object of the present invention is to provide mounting means as described above, where the mounting means can be removably secured to the support articles by Velcro fasteners, snap fasteners, suction members or a double sided adhesive tape.

A further object of the present invention is to provide mounting means as described above, where a fastener on an upper surface of one end section thereof is secured to a fastener on a lower surface of an opposite end section so that the mounting means can be disposed around the support article.

Yet another object of the present invention is to provide mounting means as described above, which includes numerous sections integrally connected together by hinges, the hinges being formed either by recesses provided in the mounting means or by flexible accordian-like portions integrally connecting the sections together.

Still another object of the present invention is to provide mounting means as described above, which is inexpensive to manufacture, and which is easy to secure to a convex, concave or stepped surfaces of the support article.

Briefly, in accordance with the present invention, a mounting member is provided for removably securing conventional items, such as flip up and down glasses, compasses, pedometers, pouches, purses, cases, clips, holding members, flashlights or pen lights, watches and the like, to support articles, such as baseball caps, head sweat bands, clothing, footwear, parts of a person's body, posts, steps, moldings and the like. The support articles have convex, concave or stepped surfaces. The mounting member is provided with transverse hinges between sections thereof to permit the sections to pivot both upwardly and downwardly relative to each other so that the mounting member can be positioned on a curved article, where the hinges can have flexible accordian-like portions to permit the sections to pivot or swing transversely from side to side relative to each other to provide a curved arrangement.

In one embodiment, one of the sections can include an adjustment member to position the flip up and down glasses relative to a wearer's eyes.

The item can be formed integrally on one section or can be removably secured thereto by Velcro fasteners, snap fasteners, suction members or a double sided adhesive tape. The mounting member can be removably secured to the support article by any one of the above mentioned fasteners.

In another embodiment, a fastener on an upper surface of one end section is secured to a fastener on a lower surface of an opposite end section so that the mounting member is disposed around the support article.

In a further embodiment, a socket portion is integrally secured to one section of the mounting member to receive a ball disposed on one end of a flashlight to provide a universal joint so that the flashlight can be pivoted up, down and sideways relative to the mounting member.

The mounting member can be provided with numerous sections integrally connected together by the hinges.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of preferred embodiments in which:

FIG. 12 is a perspective view of further modified removable mounting means similar to FIG. 6;

FIG. 13 is a fragmented sectional side view of the mounting means of FIG. 12, showing the adjustable member therein;

FIG. 14 is a fragmented sectional side view similar to FIG. 13, showing the adjustable member in an extended position;

FIG. 15 is a fragmented sectional side view of modified mounting means which is secured to an article by adhesive means;

FIG. 16 is a fragmented sectional side view showing further modified mounting means secured to an article by snap fastener means;

FIG. 17 is a fragmented sectional side view of another modified mounting means secured to an article by suction means;

FIG. 18 is a perspective view of still another modified mounting means;

FIG. 19 is a perspective view of a compass which is removably attachable to the mounting means of FIG. 18;

FIG. 20 is a perspective view of a pedometer which is removably attachable to the mounting means of FIG. 18;

FIG. 21 is a perspective view of a pouch, purse or case which is removably attachable to the mounting means of FIG. 18;

FIG. 22 is a perspective view of clip means which is removably attachable to the mounting means of FIG. 18;

FIG. 23 is a perspective view of modified clip means which is removably attachable to the mounting means of FIG. 18;

FIG. 24 is a perspective view of holding means which is removably attachable to the mounting means of FIG. 18, which holds a small flashlight or pen light;

FIG. 25 is a perspective view of modified holding means, shown in the open position, which is removably attachable to the mounting means of FIG. 18;

FIG. 26 is a perspective view showing the modified holding means of FIG. 25 in a closed position;

FIG. 27 is a perspective view showing the holding means of FIG. 18 being used with the clip of FIG. 23 to hold a comb on a baseball cap and also to hold the flashlight or pen light of FIG. 24 on the visor of the cap;

FIG. 28 is a side view showing the modified holding means of FIG. 25 secured to the sleeve of a person's shirt or jacket by the mounting means of FIG. 18, and also showing the compass of FIG. 19 secured to the cuff thereof by the holding means of FIG. 18;

FIG. 29 is a perspective view showing the holding means of FIG. 18 being used to hold the pouch of FIG. 21 on footwear, such as a sneaker;

FIG. 30 is a perspective view of a modified case which is removably attachable to the mounting means of FIG. 18;

FIG. 31 is a perspective view showing the holding means of FIG. 18 being used to hold a modified pouch on wearing apparel, such as trousers, slacks, jogging pants, sweat pants and the like;

FIG. 32 is a fragmented perspective view showing a flashlight rotatably secured to the holding means of FIG. 18;

FIG. 33 is a fragmented sectional view of the mounting means of FIG. 32;

FIG. 34 is a fragmented front view of the mounting means of FIG. 32;

FIG. 35 is a perspective view showing the compass integrally forming a part of the mounting means;

FIG. 36 is a perspective view showing the pedometer integrally forming a part of the mounting means;

FIG. 37 is a perspective view showing clip means integrally forming a part of the mounting means;

FIG. 38 is a perspective view showing modified clip means integrally forming a part of the mounting means;

FIG. 39 is a perspective view showing holding means integrally forming a part of the mounting means;

FIG. 40 is a perspective view showing modified holding means integrally forming a part of the mounting means;

FIG. 41 is a perspective view showing the clip means of FIG. 38 mounted on a round convex surface;

In the various figures of the drawings, like reference characters designate like parts.

DESCRIPTION OF THE PREFERRED EMBODIMENTS

Figure 1:
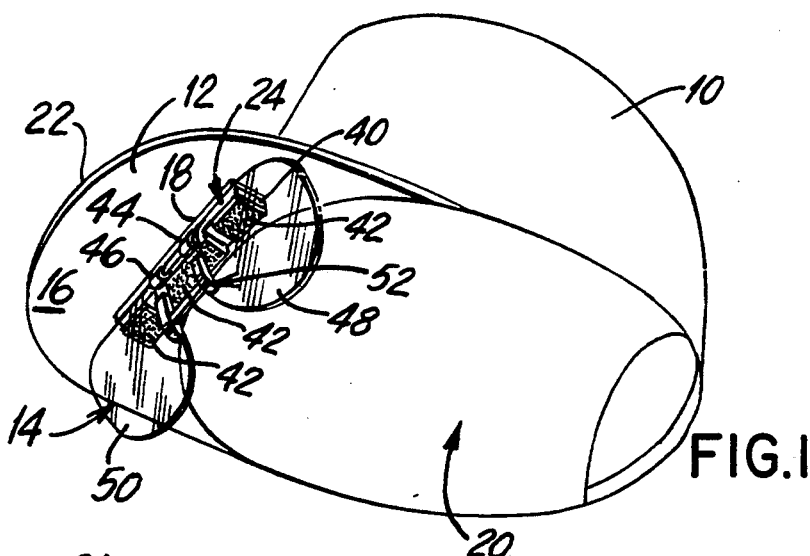
FIG. 1 is a perspective view of a baseball cap provided with flip up and down glasses secured thereto by removable mounting means according to the present invention.
Figure 2:
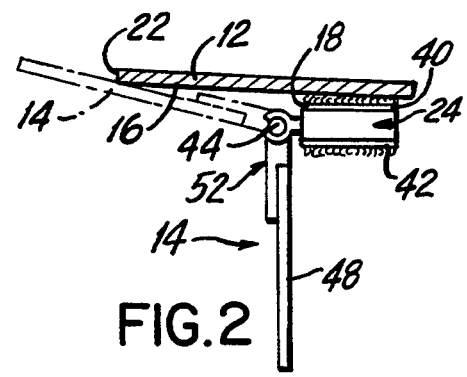
FIG. 2 is a fragmented side view, partly in section, showing the mounting means removably securing the flip up and down glasses to the peak or visor of the baseball cap of FIG. 1.

Referring now to the drawings, FIG. 1 shows a conventional cap 10, such as the well known baseball cap, having an outwardly extending peak or visor 12. Flip up and down glasses 14 are removably secured to the underside 16 of the visor 12. As best shown in FIG. 2, the upper surface of a flexible fabric strip 18 is secured by conventional means, such as an adhesive, cement or by sewing, to a central portion of the visor 12, which is adjacent to the cap opening 20 for receiving the person's head therein. The fabric strip 18 preferably has a rectangular shape with the length thereof being disposed substantially parallel to the front edge 22 of the visor 12. The opposite lower surface of the fabric strip 18 contains the loops of a Velcro fastener, being formed as a one piece construction. The term "Velcro" is a registered trademark of American Velcro, Inc.

The flip up and down glasses 14 are similar to the flip up and down glasses disclosed in Applicant's U.S. Pat. No. 5,129,102, except the mounting member 24 thereof has been modified as set forth below. The mounting member 24 is preferably fabricated from a plastic material, and has transversely extending recesses 26 formed in the upper surface 28 thereof, and associated corresponding transversely extending recesses 30 formed in the lower surface 32 thereof to provide hinge means so that the central section 34 and the opposing end sections 36, 38 formed thereby into rectangular configurations can pivot relative to each other, both upwardly and downwardly as indicated by the phantom lines in FIG. 5, in order for the mounting member 24 to substantially conform to the curvature of the cap visor 12 and also to bend with the cap visor 12 when mounted thereon as shown in FIG. 1.

Figure 5:
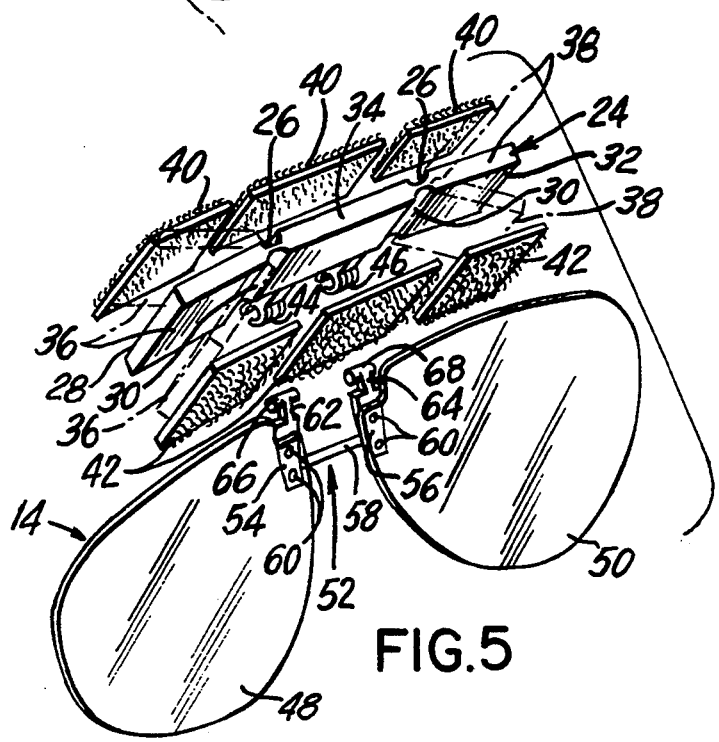
FIG. 5 is an exploded perspective view of the flip up and down glasses and the removable mounting means shown in FIGS. 1-4.

As shown in FIG. 5, separate material portions 40 are secured by conventional means to one side, such as the upper surface 28 of the associated sections 34, 36, 38 of the mounting member 24, and additional material portions 42 are secured by conventional means to the opposite side, such as the lower surface 32 of the associated sections 34, 36, 38 of the mounting member 24 so that each of the sections 34, 36, 38 has a pair of material portions 40, 42 on opposite sides thereof. Each of the material portions 40, 42 contain hooks on the outer surfaces thereof of a Velcro fastener for engaging the above-mentioned loops of the Velcro fastener and the like, as will be discussed below.

Additionally, the central section 34 is provided with C-shaped portions 44, 46 extending outwardly from one edge thereof so that the C-shaped portions 44, 46 extend beyond the edge with the openings thereof facing horizontally outwardly from the edge. Lenses 48, 50, such as prescription lenses or lenses for sunglasses, are secured together by an H-shaped member 52. The H-shaped member 52 includes side portions 54, 56 which are connected together by a bridge portion 58. The side portions 54, 56 are connected to the lenses 48, 50 by conventional means, such as screws or rivets 60 so that the bridge portion 58 is disposed between and separates the lenses 48, 50. At the upper ends of the side portions 54, 56 are reduced portions 62, 64 having cylindrical portions 66, 68 at the free ends thereof.

The cylindrical portions 66, 68 are removably received in the C-shaped portions 44, 46, respectively, so that the H-shaped portion 52 and the lenses 48, 50 connected thereto are free to pivot within the C-shaped portions 44, 46 to permit the lenses 48, 50 to flip up and down relative to the mounting member 24. It is understood, that the C-shaped portions 44, 46 are spaced apart on the mounting member 24 a predetermined distance so that the cylindrical portions 66, 68 of the H-shaped member 52 can be received exactly within the C-shaped portions 44, 46, respectively.

Accordingly, the fabric strip 18 with the Velcro loops facing downwardly or outwardly, is secured to the undersurface 16 of the cap visor 12, where the positioning thereof can be made according to the requirements of the wearer of the cap 10. The lenses 48, 50 and the H-shaped member 52 are removably, pivotally secured to the mounting member 24 as mentioned above, where the Velcro material portions 40, 42 are already secured on the mounting member 24 in the manner mentioned above. The mounting member 24 is now positioned against the fabric strip 18 on the cap visor 12 so that the Velcro material portions 40 on the upper surfaces thereof are removably secured to the fabric strip 18 in a well known manner, as shown in FIG. 1.

The person can now place the cap 10 on his head and flip the glasses 14 up and down as desired. It is noted, that if the person wishes to use the cap 10 without the glasses 14, all the person need do is remove the mounting member 24 from the fabric strip 18 so that the Velcro fasteners are separated from each other in a well known manner. Furthermore, when the lenses 48, 50 are flipped up against the visor 12, as shown in phantom lines in FIG. 2, the lenses 48, 50 are frictionally maintained in this flipped up position.

Figure 3:
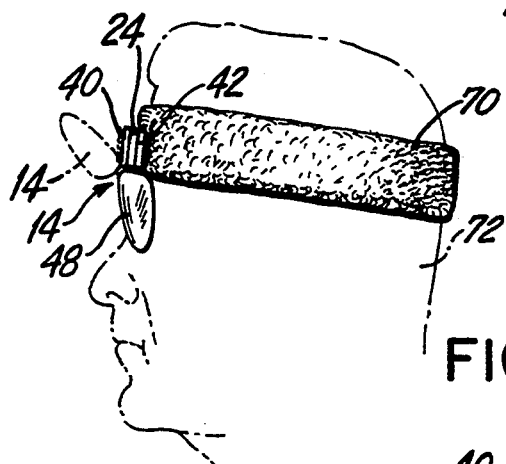
FIG. 3 is a side view of a head sweat band provided with the flip up and down glasses secured thereto by the removable mounting means.

The improved feature of having the additional material portions 42 on the opposite side of the mounting member 24 will now be discussed. FIG. 3 shows a sweat band 70 worn on a person's head 72, shown in phantom lines, with the glasses 14 mounted thereon. In this arrangement, the opposing material portions 42 are secured to the sweat band 70 rather than the above-mentioned material portions 40, in order for the lenses 48, 50 to be properly positioned relative to the eyes of the wearer. It is noted, that in most cases, the sweat band 70 is fabricated from a material having loops thereon similar to that of a Velcro fastener, so that the above-mentioned fabric strip 18 is not necessary. However, if the material of the sweat band 70 is not suitable for attachment to the Velcro fastener of the mounting member 24, then the fabric strip 18 would first be secured by conventional means to the sweat band 70 to function in the same manner as mentioned above.

Figure 4:
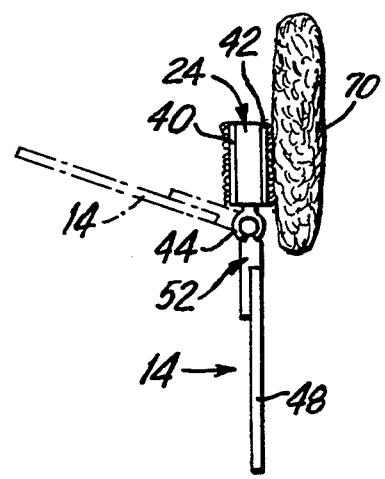
FIG. 4 is a side view, showing the mounting means removably securing the flip up and down glasses to the head sweat band of FIG. 3.

The person can mount the glasses 14 on the sweat band 70 before or after the sweat band 70 is placed on his head 72. It is noted, that if the person wishes to use the sweat band 70 without the glasses 14, all the person need do is remove the mounting member 24 therefrom so that the Velcro fastener is separated from the head band 70 in a well known manner. Here again, when the lenses 48, 50 are flipped up, as shown in phantom lines in FIGS. 3 and 4, the lenses 48, 50 are frictionally maintained in this flipped up position.

Thus, as shown above, the material portions 40, 42 disposed on opposite sides of the mounting member 24 permit the lenses 48, 50 to be properly positioned on different articles, such as the above-mentioned cap 10 and sweat band 70, worn on a person's head. Furthermore, the recesses 26, 30 formed in the mounting member 24 permit the sections 34, 36, 38 to pivot relative to each other so that the mounting member 24 can substantially conform to the curvature of an article, such as the above-mentioned cap visor 12 and sweat band 70, when mounted thereon.

FIGS. 6-11 show a modified mounting member 72 which permits adjustment of the lenses 48, 50 relative to the wearer's eyes. The mounting member 72, preferably fabricated from a plastic material, includes the above-mentioned transversely extending recesses 26, 28 on opposite sides thereof to provide the opposing end sections 36, 38 and a modified central section 74, as discussed below. Here again, the material portions 40, 42 are secured by conventional means to opposite sides of the associated sections 36, 38, 74, to function in the same manner as mentioned above.

Figure 7:
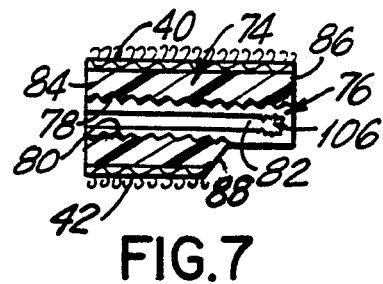
FIG. 7 is a cross-sectional view taken along line 7—7 of FIG. 6.

As best shown in FIG. 7, the central portion 74 has a centrally located opening 76 extending transversely therethrough. The upper and lower walls 78, 80 of the opening 76 are serrated or saw-toothed in the longitudinal direction, the function of which will be explained below. Additionally, the opposing side walls of the opening 76 each have a slot 82 transversely extending from the rear wall 84 to a spaced distance from the front wall 86 of the central section 74 of the mounting member 72, further details of which will be set forth below. Furthermore, the lower portion of the central section 74 has a tapered-front wall 88 which is recessed in a predetermined distance from the front wall 86 below the opening 76, the function of which will be explained below.

Figure 6:
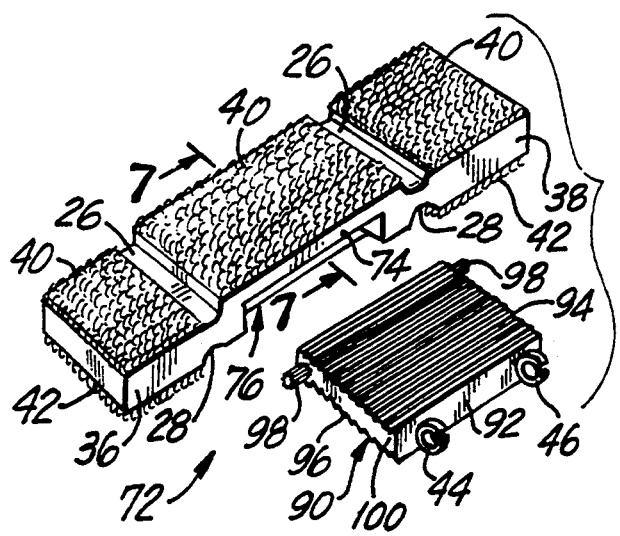
FIG. 6 is an exploded perspective view showing modified removable mounting means having an adjustable member.

As best shown in FIG. 6, an adjustment member 90 is adapted to be received in the opening 76 of the central section 74. The C-shaped portions 44, 46 extend outwardly from the front edge 92 of the adjustment member 90, and function in the same manner as mentioned above. The top and bottom surfaces 94, 96 of the adjustment member 90 are serrated or saw-toothed in the longitudinal direction in the same manner as the upper and lower walls 78, 80 of the opening 76 in the central section 74, the function of which will be explained below. Additionally, a pair of pins 98 extend outwardly in the longitudinal direction from a rear portion of the opposing side walls 100. The outer surfaces of the pins 98 are serrated or saw-toothed, the function of which will also be explained below.

Figure 8:
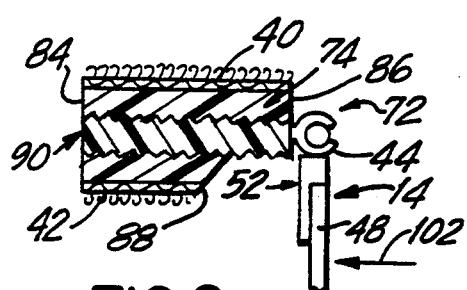
FIG. 8 is a cross-sectional view similar to FIG. 7 showing the adjustable member therein.

Accordingly, in the assembly, the adjustment member 90 is inserted with the C-shaped portions 44, 46 first into the opening 76 from the rear wall 84 of the central section 74 until the C-shaped portions 44, 46 extend outwardly from the front wall 86 of the central section 74 as shown in FIG. 8. During the insertion, the serrations on the upper and lower surfaces of the adjustment member 90 engage and disengage the serrations in the upper and lower walls 78, 80 of the opening 76 as the adjustment member 90 moves or is pushed through the opening 76 due to the insertion force applied to the adjustment member 90. Additionally, the pins 98 are received in their associated slots 82 formed in the opposing side walls of the opening 76. After the insertion, the cylindrical portions 66, 68 of the glasses 14 are mounted in the C-shaped portions 44, 46 so that the H-shaped portion 52 and the lenses 48, 50 connected thereto are free to pivot. It is noted, for proper use, the user's eyes are directed towards the lenses 48, 50 in the direction shown by arrow 102 in FIG. 8.

Figure 9:
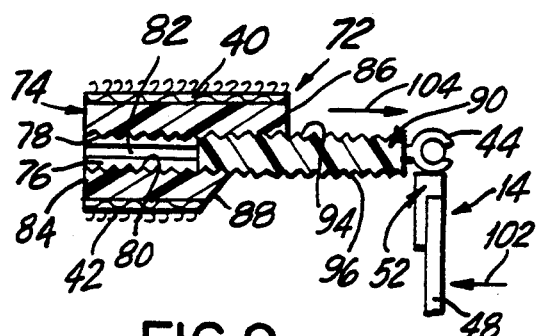
FIG. 9 is a cross-sectional view similar to FIG. 8 showing the adjustable member in an extended position.
Figure 11:
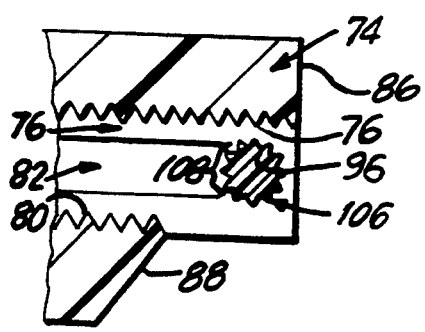
FIG. 11 is an enlarged fragmented cross-sectional view showing a portion of the body member having the adjustable member rotatably attached thereto when the adjustable member is in the position shown in FIG. 10.

Accordingly, when the wearer desires to have the lenses 48, 50 closer to his eyes, the wearer applies a sufficient amount of force on the adjustment member 90 to overcome the serration engagement between the adjustment member 90 and the central portion 74 to move the adjustment member 90 in the direction of arrow 104 outwardly from the opening 76, as shown in FIG. 9, which is permitted due to the resiliency of the plastic material forming the serrations. Once the wearer has the adjustment member 90 in the desired position, the interlocking of the serrations on the adjustment member 90 and the central section 74 maintains the adjustment member 90 in the set position. It is noted, that the pins 98, which are received in the slots 82, prevent the adjustment member 90 from being pulled completely out from the front wall 86 of the central section 74, particularly since the slots 82 end a predetermined distance from the front wall 86 as mentioned above.

Figure 10:
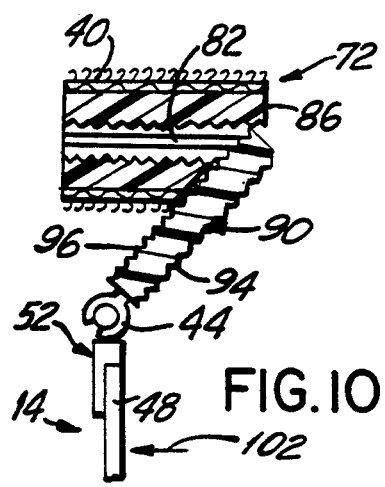
FIG. 10 is a cross-sectional view similar to FIG. 9 showing the adjustable member in an extended and downwardly pivoted position.

As indicated in FIG. 10, additional positions of the adjustment member 90 can be obtained, such as a desired lower position for the lenses 48, 50. As best shown in the enlarged cross section of FIG. 11, the blind end 106 of each of the slots 82 is also serrated or saw-toothed, matching the configuration of the pins 98. Additionally, a pair of pimples 108 are provided on the upper and lower walls of each slot 82 at a predetermined position to provide a narrow entrance into the blind end 106.

Accordingly, the adjustment member 90 is moved all the way towards the front wall 86 so that the pins 98 thereof are forced past the pimples 108 and into the blind end 106 of the slots 82 so that the serrations of the pins 98 and of the blind end 106 matingly engage each other, where the pimples 108 maintain the pins 98 within the blind end 106. Thereafter, the adjustment member 90 can be rotated downwardly by applying a sufficient force to overcome the serration engagement of the pins 98. FIG. 10 shows the adjustment member 90 rotated the full extent so that the bottom surface 96 of the adjustment member 90 is disposed against the tapered front wall 88 of the central section 74. It is noted, the recessed tapered front wall 88 provides the necessary clearance to permit the above-mentioned rotation of the adjustment member 90 as mentioned above. Thus, the lenses 48, 50 are in a lower position, and can be adjusted closer or further away relative to the wearer's eyes by rotating the adjustment member 90 as mentioned above.

FIGS. 12, 13 and 14 disclose a further modified mounting member 110 which is similar to but simpler than the above-mentioned mounting member 72, in that the mounting member 110 does not have the above-mentioned pins 98. Accordingly, mounting member 110 also permits adjustment of the lenses 48, 50 relative to the wearer's eyes. The mounting member 110, preferably fabricated from a plastic material, includes the above-mentioned transversely extending recesses 26, 28 on opposite sides thereof to provide the opposing end sections 36, 38 and a modified central section 112, as discussed below. Once again, the material portions 40, 42 are secured by conventional means to opposite sides of the associated sections 36, 38, 112 to function in the same manner as mentioned above. The central section 112 also has a centrally located opening 114 extending transversely therethrough, with the upper and lower walls 116,118 thereof being serrated or saw-toothed in the longitudinal direction, in the same manner as mentioned above.

As best shown in FIG. 12, an adjustment member 120 is adapted to be received in the opening 114 of the central section 112, where the C-shaped portions 44, 46 extend outwardly from the front edge 92, and function in the same manner as mentioned above. Here again, the top and bottom surfaces 94, 96 are serrated or saw-toothed in the same manner as indicated above. Accordingly, in the assembly, the adjustment member 120 can be inserted into the opening 114 from either end thereof by applying a sufficient insertion force to the adjustment member 120. Additionally, the glasses 14 are mounted in the C-shaped portions 44, 46 of the adjustment member 120 in the same manner as mentioned above.

FIG. 13 shows the adjustment member 120 fully inserted in the opening 114 of the central section 112, being similar to FIG. 8, where the user's eyes are again directed towards the lenses 48, 50 in the direction shown by the arrow 102. FIG. 14, shows the adjustment member 120 moved in the direction of arrow 104 outwardly from the opening 114 in a similar manner as mentioned above with respect to FIG. 9. Thus, as set forth above, the lenses 48, 50 can be adjusted relative to the wearer's eyes. Furthermore, in each of the embodiments mentioned above, the mounting member was secured to the article, such as the baseball cap 10 and the sweat band 70, by a Velco type fastener. However, it is understood, that other types of fastening means can be used to secure the mounting member to an article, where a few examples thereof are set forth below.

FIG. 15 shows a mounting member, such as the above-mentioned mounting member 24 or any one of the above modified mounting members 72, 110, secured to an article, such as the above mentioned sweat band 70, by adhesive means 122. The adhesive means 122 can either be the removable type, such as a double sided adhesive tape, or if desired, can be a permanent type adhesive.

FIG. 16 shows a mounting member, such as the above-mentioned mounting member 24 or any one of the above modified mounting members 72, 110, secured to an article such as the above mentioned sweat band 70, by snap fasteners 124. Accordingly, the female snap fastener 126 is permanently secured to the sweat band 70, and the male snap fastener 128 is permanently secured to the mounting member 24. Any desired number of snap fasteners 124 can be used to removably secure the mounting member 24 to the sweat band 70.

FIG. 17 shows a mounting member, such as the above-mentioned mounting member 24 or any one of the above modified mounting members 72, 110, secured to an article, such as the peak 12 of the above-mentioned baseball cap 10, by suction means 130. In order for the suction means 130, such as rubber or plastic suction members to properly function, the peak 12 of the baseball cap 10 should be fabricated from a non-porous plastic material. Any desired number of suction means 130 can be used to secure the mounting member 24 to the peak 12.

The mounting member of the present invention, in the forms shown above or in any further modified form, can be used to removably attach many different types of items to various articles, such as wearing apparel. By way of example, modified mounting members and various attachable items are described below.

FIG. 18 shows a modified mounting member 132 which is similar to the above-mentioned mounting member 24 except the above C-shaped portions 44, 46 have been removed therefrom. Furthermore, additional transversely extending recesses 26 are formed in the upper surface 28 thereof, and associated corresponding transversely extending additional recesses 30 are formed in the lower surface 32 thereof to provide more of the above-mentioned hinged means so that the larger central section 34 and the opposing two sections 36, 37 and 38, 39, formed thereby into rectangular configurations, can pivot relative to each other both upwardly and downwardly in the manner mentioned above. Thus, the mounting member 132 can substantially conform to the curvature of an article, such as wearing apparel, and can also bend therewith.

Preferably, only one material portion 40 is secured by conventional means to the upper surface of the central portion 34, though it is understood that additional material portions 40 could also be secured to the upper surfaces of the other sections 36, 37, 38, 39, for the purposes mentioned below. Additional material portions 42 are also secured by conventional means to the opposite side of the mounting member 132, such as the lower surfaces of the associated sections 34, 36, 37, 38, 39, as shown in FIG. 18, so that the material portions 40, 42 are disposed on opposite sides of the mounting member 132. As described above, each of the material portions 40, 42 contain hooks on the outer surfaces thereof of a Velcro fastener for engaging with the loops of a Velcro fastener and the like, as will be discussed below.

Accordingly, by way of example, FIGS. 19-26 show different types of items which can be secured to the above-mentioned mounting member 132 for attachment to various articles, such as wearing apparel. The examples are now described below.

FIG. 19 shows a conventional compass 134 which is commercially available. Accordingly, the back of the compass 134 is secured by conventional means, such as an adhesive, cement and the like, to a suitable material portion 136, of the type mentioned above, containing the loops of a Velco fastener and the like on the outer surface thereof for engagement with the hooks of the Velcro fastener on the above-mentioned material portion 40 on the mounting member 132. Thus, when the mounting member 132 is attached to the wearing apparel, the compass 134 attached thereon will indicate to the wearer the direction in which the wearer is walking or travelling.

FIG. 20 shows a conventional pedometer 138 which is commercially available. Accordingly, the back of the pedometer 138 is secured by conventional means, such as an adhesive, cement and the like, to the above-mentioned material portion 136 containing the loops of a Velcro fastener and the like on the outer surface thereof for engagement with the hooks of the Velcro fastener on the above-mentioned material portion 40 on the mounting member 132. Thus, when the mounting member 132 is attached to the wearing apparel, such as to the trouser legs thereof, the pedometer 138 attached thereon will indicate the distance the wearer has walked. Obviously, the pedometer 138 can be attached to other moving objects in a conventional manner to indicate the distance travelled.

FIG. 21 discloses a conventional pouch or carrying case 140 which is commercially available. The pouch or carrying case 140 includes a closeable flap 142 which is held in the closed position by engageable male and female snap fasteners 144,146 in a conventional manner. Here again, the back of the pouch or carrying case 140 is secured by conventional means, such as an adhesive, cement and the like, to the above-mentioned material portion 136 containing the loops of a Velcro fastener and the like on the outer surface thereof for engagement with the hooks of the Velcro fastener on the above-mentioned material portion 40 on the mounting member 132. Thus, when the mounting member 132 is attached to an article of clothing, the pouch or carrying case 140 attached thereon can be used to store items therein, such as the identification of the wearer, money, keys, and other items the wearer desires to have on his person.

FIG. 22 shows a conventional clip 148 which is commercially available. Once again, the back of the clip 48 is secured by conventional means, such as an adhesive, cement and the like, to the above-mentioned material portion 136 containing the loops of a Velcro fastener and the like on the outer surface thereof for engagement with the hooks of the Velcro fastener on the above-mentioned material portion 40 on the mounting member 132. The clip 148 includes a base 150, a finger 152 bent back from one end thereof over the base 150 to function in a resilient manner, and an inwardly hooked portion 154 extending upwardly from the opposite end thereof. Accordingly, an item is positioned between the finger 152 and the base 150, being disposed against the hooked portion 154, and is held in place by the resiliency of the finger 152. Thus, when the mounting member 132 is attached to an article of clothing, the clip 148 attached thereon can be used to hold various items, such as a towel, a hat, and other items that permit clipping thereon.

FIG. 23 shows a conventional spring clip 156 which is commercially available. As above, the above-mentioned material portion 136 is secured by conventional means, such as an adhesive, cement and the like, to the spring clip 156 so that the loops of a Velcro fastener and the like on the outer surface of the material portion 136 can be engaged with hooks of the Velcro fastener of the above-mentioned material portion 40 on the mounting member 132. The spring clip 156 includes two arm portions 158, 160 which are pivotally held together by a spring member 162 in such a manner that the handle ends 164, 166 of the arm portions 158, 160 respectively are normally biased apart so that the clamping ends 168, 170 of the arm portions 158, 160 are tensioned together.

In order to engage or release an item, such as paper sheets, cards and the like, the handle ends 164, 166 are squeezed together to spread the clamping ends 168, 170 apart to insert or remove the items therebetween. Accordingly, when the handle ends 164, 166 are released, the spring 162 forces the clamping ends 168, 170 back together again. It is noted, that the material portion 136 can be positioned on any portion of one of the arm portions 158, 160, such as on the outer surface of the clamping portion 170 thereof, as shown in FIG. 23. Thus, when the mounting member 132 is fastened to an article of clothing, the spring clip 156 attached thereon can be used to hold desired items, such as an identification card, paper money, sheets of paper and the like.

FIG. 24 shows a holding member 172 which is adapted to hold a conventional small flashlight or pen light 174 which is commercially available. Accordingly, the above-mentioned material portion 136 containing the loops of a Velcro fastener and the like on the outer surface thereof is secured by conventional means, such as an adhesive, cement and the like, to the back of the holding member 172 so that the hooks of the Velcro fastener on the above-mentioned material portion 40 on the mounting member 132 can engage the loops of the material portion 136 to secure the holding member 172 thereto. The holding member 172 includes a base portion 176 having a semi-circular portion 178 extending from the front thereof, with the semi-circular opening therein facing away from the front. Another material portion 180, preferably containing the hooks of a Velcro fastener and the like on the outer surface thereof, is secured by conventional means, such as an adhesive, cement and the like, within the opening of the semi-circular portion 178.

The flashlight or pen light 174 is provided with a further material portion 182 disposed around the body portion thereof, being secured thereto by conventional means, such as an adhesive, cement and the like. Preferably, the material portion 182 contains loops of a Velcro fastener and the like on the outer surface thereof for engagement with the hooks of the Velcro fastener on the material portion 180 to secure the flashlight or pen light 174 to the holding member .172. The flashlight or pen light 174 has switch means 184 on one end thereof to turn the flashlight or pen light 174 on and off in a conventional manner. Additionally, a loop member 186 is provided on the end of the switch means 184 opposite the light 188 thereof, for hanging or securing the flashlight or pen light 174 when not in use in a conventional manner.

It is noted, that the above flashlight or pen light 174 is merely shown as an example of an item which can be held by the holding member 172, where obviously other such items can also be held by the holding member 172. For example, as indicated below, the holding member 172 can be used to hold a tennis ball, where the hooks of the material portion 180 engage the outer covering of the tennis ball without the need of providing the tennis ball with an additional material portion containing loops thereon.

FIG. 25 shows a conventional toggle clip 190 which is commercially available. Here again, the back of the toggle clip 190 is secured by conventional means, such as an adhesive, cement and the like, to the above-mentioned material portion 136 containing the loops of a Velcro fastener and the like on the outer surface thereof for engagement with the hooks of the Velcro fastener on the above-mentioned material portion 40 on the mounting member 132. The toggle clip 190 includes a base 192 on the back of which the material portion 136 is secured, and a semi-circular portion 194 on the front thereof. A C-shaped portion 196 is pivotally secured to one end of the semi-circular portion 194 and an arcuate portion 198 is pivotally secured to the other end of the semi-circular portion 194, with the C-shaped portion 196 being hingeingly connected to the arcuate portion 198, as shown in FIG. 25, so that a toggle arrangement is provided. The C-shaped portion 196 has a recess 200 in an inner surface thereof adjacent the free end portion 202 to receive the free end portion of the arcuate portion 198 when the toggle clip 190 is closed, as shown in FIG. 26.

Accordingly, a cylindrical item 204, such as a pencil, pen, small flashlight and the like, is positioned in the curved portion of either the C-shaped portion 196 or the arcuate portion 198, and then the C-shaped portion 196 and the arcuate portion 198 are pivoted towards each other so that the C-shaped portion 196 and the arcuate portion 198 are moved to a closed position by the toggle action thereof to engage and grip the cylindrical item 204 therebetween as shown in FIG. 26. To remove the cylindrical item 204, the free end portion 202 of the C-shaped portion 196 is pulled away from the arcuate portion 198 so that the toggle action thereof returns the C-shaped portion 196 and the arcuate portion 198 to the opened position as shown in FIG. 25.

Accordingly, by way of example, FIGS. 27, 28 and 29 show some of the different types of items, shown in FIGS. 19–26 secured to the above-mentioned mounting member 132, which in turn is attached to various articles. Depending upon the fabric of the article, in some cases the hooks of the material portions 42 will engage the fabric directly, particularly a wool fabric and the like. However, in other cases, it will be necessary to attach a fabric strip containing the loops of a Velcro fastener thereon, such as the above-mentioned fabric strip 18, to the article by conventional means, such as by sewing, an adhesive, cement and the like in order to attach the mounting member 132 thereto.

FIG. 27 shows the above-mentioned baseball cap 10 having one mounting member 132 secured to the front of the cap 10 and a second mounting member 132 secured to the upper surface of the peak or visor 12 thereof. Accordingly, if the cap 10 is constructed from a wool fabric, the above-mentioned fabric strip 18 is not necessary, but if constructed of another material, then the above-mentioned fabric strip 18 should be secured to the cap 10 as indicated above for engagement with the material portions 42 of the mounting member 132. Accordingly, because of the hinged sections, the mounting member 132 conforms to the shape of the cap 10 and visor 12. The above-mentioned spring clip 156 is secured to the mounting member 132 on the front of the cap 10, and is used to clip and hold a comb 206 or the like thereon. Additionally, the above-mentioned holding member 172 is secured to the mounting member 132 on the visor 12 and is used to hold the small flashlight or pen light 174 or the like thereon.

Likewise, FIG. 28 shows a person's shirt or jacket 208 having mounting members 132 secured to the sleeve 210 thereof on the shoulder portion and on the cuff portion. Accordingly, as mentioned above, a fabric strip 18 is first secured to both the shoulder portion and the cuff portion by conventional means, such as sewing, an adhesive, cement and the like. The material portions 42 of both of the mounting members 132 are then secured to the fabric strips 18 in the manner mentioned above. Thereafter, the above-mentioned compass 134 is secured to the mounting member 132 on the cuff portion, and the above mentioned toggle clip 190 is secured to the mounting member 132 on the shoulder portion of the sleeve 210. Accordingly, the toggle clip 190 is used to mount a conventional pencil 212 in the manner mentioned above.

Furthermore, FIG. 29 shows a conventional sneaker 214 having one mounting member 132 secured thereon. As indicated above, first the fabric strip 18 is secured by conventional means to the side of the sneaker 214, and then the mounting member 132 is secured thereto in the manner indicated above. Additionally, the above-mentioned pouch or carrying case 140 is secured to the mounting member 132 and is used to hold identification of the wearer, money, keys, and other items the wearer desires to have on his person.

Accordingly, the pouch or carrying case 140 can be modified to have various different configurations, which would be obvious to one skilled in the art. For example, FIG. 30 discloses a case 216, preferably fabricated from a metal material, which is commercially available for holding various items, such as coins, paper money, keys and the like. The case 216 has a slideable lid 218 with a thumb nail receiving slot 220 therein for opening same, where the slideable lid 218 is secured to the case 216 by conventional means, such as a friction fit, detent means, magnetic means, and the like. Here again, the above mentioned material portion 136 is secured to the bottom surface of the case 216 by conventional means in order to secure the case 216 to the mounting member 132 in the manner mentioned above.

FIG. 31 shows a further example of a modified pouch or carrying case 222 which is provided with a conventional zipper 224 for the opening and closing thereof. In this example, the pouch or carrying case 222 is secured to a person's trousers, slacks, jogging pants, sweat pants 226 and the like, particularly when the trousers or pants 226 are not provided with any pockets. Here again, the fabric strip 18 is secured to the trousers or pants 226 by conventional means, and then the mounting member 132 is mounted thereon in order to attach the pouch or carrying case 222 thereto in the manner mentioned above.

Thus, as shown above, a pouch or carrying case 140, 216, 222 can be attached to different types of wearing apparel by using the mounting member 132 of the present invention so that the mounting member 132 conforms to the configuration of the wearing apparel. It is noted, that the above mentioned pouch or carrying case 140, 216, 222 can also be used in place of the well known money belt, particularly where the pouch or carrying case 140, 216, 222 can be secured to a person's underwear by using the mounting member 132 of the present invention in the manner set forth above. It is felt, that further examples of the use of the pouch or carrying case 140, 216, 222 is not thought necessary, where such would be obvious to one skilled in the art.

Each of the above FIGS. 19-31 show an item which is adapted to be removably secured to the mounting member 132 shown best in FIG. 18, thus providing an arrangement of two engaged parts. However, in some instances, the item can be permanently directly secured to the mounting member by suitable means, such as by molding, adhesive, cement and the like, to provide a one piece integral construction. Examples thereof are set forth below in FIGS. 32-42.

FIGS. 32-34 disclose a small flashlight or pen light 230 which is secured directly to the upper surface 28 of the central section 34 of the mounting member 132. The mounting member 132 is constructed in the same manner as mentioned above and includes the material portions 42 on the lower surfaces of the associated sections 34, 36, 37, 38, 39, as indicated in FIG. 18. Accordingly, as best shown in FIG. 33, a socket 232 is molded onto the upper surface 28 of the central portion 34.

The flashlight or pen light 230 has a ball 234 secured to one end opposite the light bulb 236 on the other end. As shown in FIG. 33, the ball 234 is received in the socket 232, where the circular opening in the socket 232 is greater than a semi-circle in order to capture the ball 234 therein, and provide a universal joint connection therebetween. Thus, as indicated in FIG. 34, the flashlight or pen light 230 can be positioned perpendicular to the central section 34, moved up or down, to either side thereof, or in any position therebetween. The socket 232 engages the ball 234 in a friction grip so that the flashlight or pen light 230 is maintained in the selected position. The flashlight or pen light 230 can be turned on or off in any conventional manner, such as by turning the free end 238 thereof.

FIG. 35 shows the above-mentioned compass 134 secured to the central section 34 of the mounting member 132 by conventional means, such as by molding, cementing and the like. Accordingly, the rear wall of the housing 240 of the compass 134 is disposed on the central section 34 of the mounting member 132 to provide a one piece integral construction. Once again, the material portions 42 are secured to the lower surfaces of the sections 34, 36, 37, 38, 39 of the mounting member 132.

FIG. 36 shows the above-mentioned pedometer 138 secured to the central portion 34 of the mounting member 132 by conventional means, such as by molding, cementing and the like. Accordingly, the rear wall of the housing 242 of the pedometer 138 is disposed on the central section 34 of the mounting member 132 to provide a one piece integral construction. Here again, the material portions 42 are secured to the lower surfaces of the sections 34, 36, 37, 38, 39 of the mounting member 132.

FIG. 37 shows a modified conventional clip 244, similar to the above mentioned clip 148 of FIG. 22, secured to the central section 34 of the mounting member 132 by conventional means, such as by molding, cementing and the like. The clip 244, like the above-mentioned clip 148, includes a base 246, a finger 248 bent back from one end thereof over the base 246 to function in a resilient manner, and an inwardly hooked portion 250 extending upwardly from the opposite end thereof. However, in clip 244, the inner wall 252 of the base 246 and the inner wall 254 of the finger 248 are bow-shaped inwardly towards each other to increase the gripping engagement thereof, where the clip 244 functions in the same manner as the above-mentioned clip 148. Accordingly, the rear outer wall 256 of the base 246 of the clip 244 is disposed on the central section 34 of the mounting member 132 to provide a one piece integral construction. As above, the material portions 42 are secured to the lower surfaces of the sections 34, 36, 37, 38, 39 of the mounting member 132.

FIG. 38 shows the above-mentioned spring clip 156 secured to the central section 34 of the mounting member 132 by conventional means, such as by molding, cementing and the like. Accordingly, the rear outer wall 258 of the clamping end 170 of the arm portion 160 is disposed on the central section 34 of the mounting member 132 so that the arm portion 160 and the mounting member 132 provide a one piece integral construction. Once again, the material portions 42 are secured to the lower surface of the sections 34, 36, 37, 38, 39 of the mounting member 132.

FIG. 39 shows a slightly modified holding member 260, similar to the above-mentioned holding member 172 of FIG. 24, secured to the central section 34 of the mounting member 132 by conventional means, such as by molding, cementing and the like. The holding member 260 includes a base portion 262 having a semi-circular portion 264 extending therefrom with the semi-circular opening therein facing away from the base portion 262. As indicated above, the above material portion 180 is secured by conventional means within the opening of the semi-circular portion 264. Accordingly, the rear wall of the base portion 262 of the holding member 260 is disposed on the central section 34 of the mounting member 132 to provide a one piece integral construction. Here again, the material portions 42 are secured to the lower surfaces of the sections 34, 36, 37, 38, 39 of the mounting member 132. It is noted, for example, the holding member 260 can be used to hold a conventional tennis ball 266 shown in phantom lines, where the hooks of the material portion 180 engage the outer covering of the tennis ball 266 without the need of providing the tennis ball 266 with any additional material portion containing loops thereon. Thus, the tennis ball 266 is held while the player is serving with a first tennis ball.

FIG. 40 shows a toggle clip 268 which is substantially the same as the toggle clip 190 of FIGS. 25, 26, except the base 192 of toggle clip 190 has been eliminated. Accordingly, the rear wall of the base portion 270 of the semi-circular portion 194 of the toggle clip 268 is secured to the central section 34 of the mounting member 132 by conventional means, such as by molding, cementing and the like, to provide a one piece integral construction. Furthermore, as indicated above, the material portions 42 are secured to the lower surfaces of the sections 34, 36, 37, 38, 39 of the mounting member 132.

By way of example, FIG. 41 shows the integral construction of the spring clip 156 and the mounting member 132, shown in FIG. 38, mounted on a round convex surface, such as a rod, pole or post 272. Prior to the mounting thereof, the above mentioned fabric strip 18 is first secured by conventional means, such as an adhesive, cement and the like, to the outer surface of the post 272. The material portions 42 of the mounting member 132 are then secured to the fabric strip 18 in the manner mentioned above so that the spring clip 156 is secured to the post 272. The spring clip 156 can now be used to securely hold a conventional sheet of paper 274 and the like in the manner mentioned above.

Figure 42:
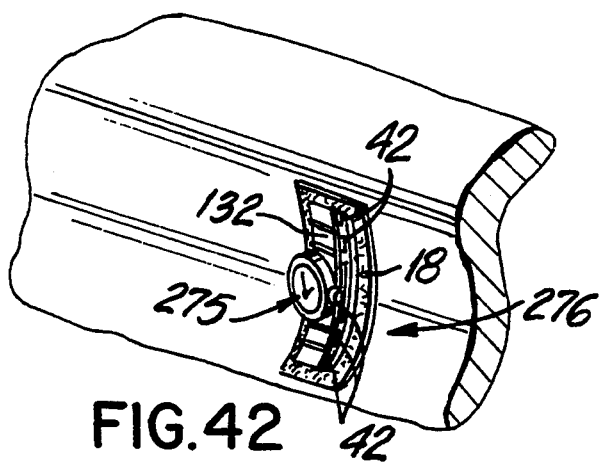
FIG. 42 is a perspective view showing an integral watch and mounting means mounted on a concave surface.

Further by way of example, FIG. 42 shows the integral construction of a conventional watch 275 and the mounting member 132, similar to the compass 134 shown in FIG. 35, mounted on a concave surface 276, such as a dashboard of an automobile, a boat, an airplane and the like. Here again, prior to the mounting thereof, the above-mentioned fabric strip 18 is first secured by conventional means, such as an adhesive, cement and the like, to the concave surface 276. The material portions 42 of the mounting member 132 are then secured to the fabric strip 18 in the manner mentioned above so that the watch 275 is secured to the concave surface 276. The watch 275 can now be used to indicate the time.

Figure 43:
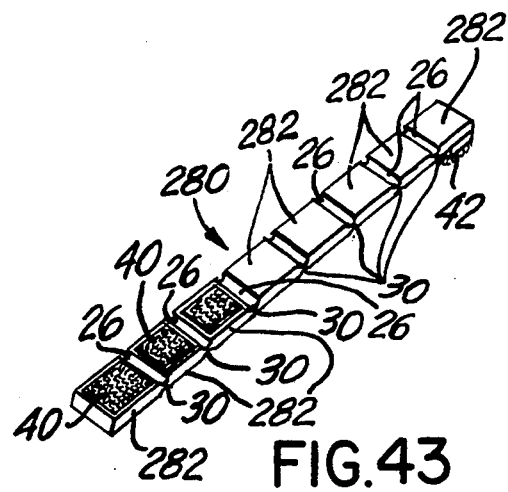
FIG. 43 is a perspective view of still a further modified mounting means.

FIG. 43 shows a further modified mounting member 280 which is similar to the above-mentioned mounting members 24, 132, where the mounting member 280 can be made in any desired length to include numerous hinged together sections 282. In the manner mentioned above, transversely extending recesses 26, 30 are formed in the upper and lower surfaces thereof to provide the hinged means between the sections 282 so that the sections 282 can pivot relative to each other both upwardly and downwardly in the manner mentioned above. Additionally, one material portion 42 is provided on the lower surface of the last section 282 at one end thereof, and at least one material portion 40 is provided on the upper surface of the first section 282 at the opposite end thereof. However, preferably there are a few material portions 40 provided on the upper surface of the first few sections 282, as shown in FIG. 43, so that a size adjustment can be made as indicated below. In this embodiment, as shown by way of example below, the mounting member 280 is wrapped around an article and secured to itself by engaging the material portion 42 with one of the material portions 40, where obviously one of the material portions 40, 42 would contain the hooks and the other would contain the loops of a Velcro fastener, preferably the hooks being on the material portion 40 for the reasons mentioned below.

Figure 45:
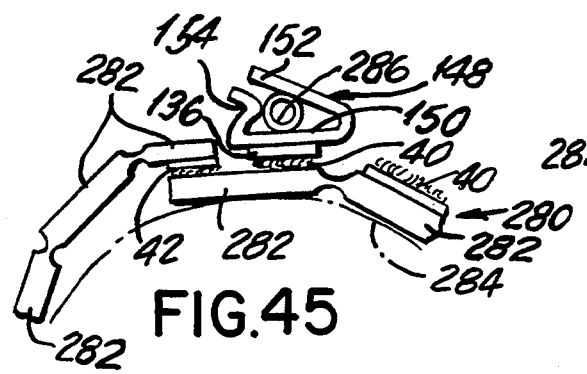
FIG. 45 is a fragmented side view of the mounting means of FIG. 44.
Figure 44:
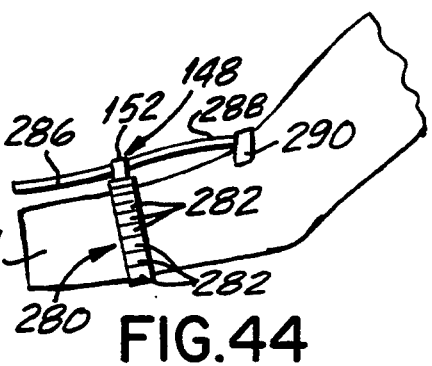
FIG. 44 shows the mounting means of FIG. 43 mounted on a person's arm.

FIGS. 44, 45, by way of example, show the mounting member 280 wrapped around a person's forearm 284. The above-mentioned clip 148, shown in FIG. 22, is secured by the loops of the material portion 136 thereof to the hooks of the material portion 40 disposed on the first section 282. Additionally, the material portion 42 on the last section 282 is also secured to the material portion 40 on the first section 282 to secure the mounting member 280 on the forearm 284. Obviously, if the mounting member 280 is not tightly secured on the forearm 284, then the clip 148 and the last section 282 can be secured on either the second or the third section 282 to provide a secure tight engagement. It is further noted, that the last section 182, can be secured to another section 82, such as the first or second, and the clip 148 can be secured to another section 182, such as the third.

In this case, the clip 148 is used to hold a conventional intravenous tube 286, the end 288 of which is inserted into the person's arm in a conventional manner and held in place by a conventional tape 290, as shown in FIG. 44, which is well known in the art. Thus, the clip 148 prevents the end 288 of the intravenous tube 286 from being accidentally pulled out of the person's arm.

Figure 46:
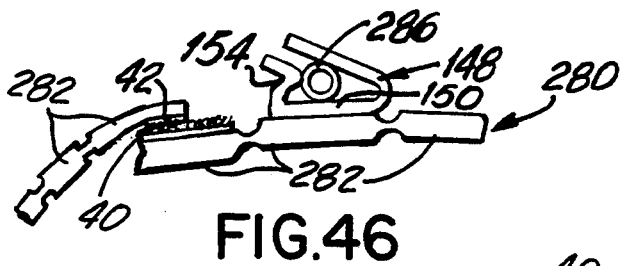
FIG. 46 is a fragmented side view showing modified mounting means similar to the mounting means of FIG. 45.

FIG. 46 shows a modification whereby the clip 148 is secured to a selected one of the sections 282 by conventional means, such as by molding, cementing and the like, to provide a one piece integral construction in the manner mentioned above, such as indicated in FIG. 37. Obviously, any of the above-mentioned items can be attached to the mounting member 280 by the material portion 136, or be secured thereto by molding, cementing and the like, in the same manner mentioned above, with respect to the clip 148 shown best in FIGS. 45 and 46.

Figure 47:
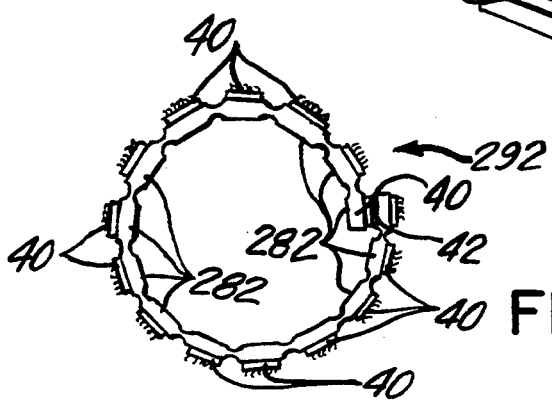
FIG. 47 is a side view showing further modified mounting means similar to the mounting means of FIG. 43.

FIG. 47 shows a modified mounting member 292 similar to the above-mentioned mounting member 280, but having the material portions 40 on the upper surface of all the sections 282 so that more than one of the same or different types of the above-mentioned items can be secured thereto. Obviously, depending upon its use, the mounting member 292 can be made in any length so as to be wrapped around a person's wrist, arm, leg, waist, ankle, neck, and any other desired part of the person, or a round article, such as the above-mentioned post 272. Here again, as indicated above, rather than removably securing the item to the mounting member 292 using the material portions 40 for engaging the material portion 136 of the item, the item can be permanently directly secured to one or more of the sections 282 by conventional means, such as by molding, cementing and the like, to provide a one piece integral construction.

Figure 48:
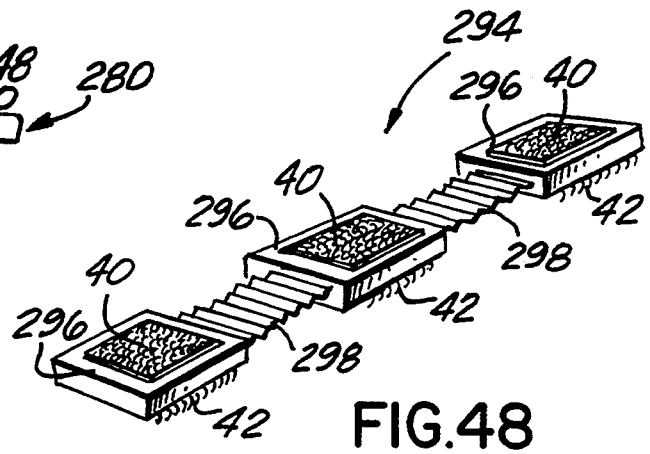
FIG. 48 is a perspective view of yet another modified mounting means.

FIG. 48 shows another modified mounting member 294 which is similar to the above-mentioned mounting members, where all the mounting members of the present invention are preferably fabricated from a plastic material. The mounting member 294 can be made in any desired length to include numerous hinged together sections 296, where only three sections 296 are shown in FIGS. 48-52. Additionally, the hinges 298 disposed between the sections 296, which are integrally joined to the sections 296 in a one piece construction, are flexible and have an accordian-like construction which permits the sections 296 to pivot relative to each other both upwardly and downwardly in the manner mentioned above, and also permits the sections to pivot or swing transversely to one side or to the other side relative to each other, as shown below by example. Furthermore, as in the above manner, a material portion 40 is provided on the upper surface of each of the sections 296, and another material portion 42 is provided on the lower surface of each of the sections 296, to function in the manner mentioned above.

Figure 49:
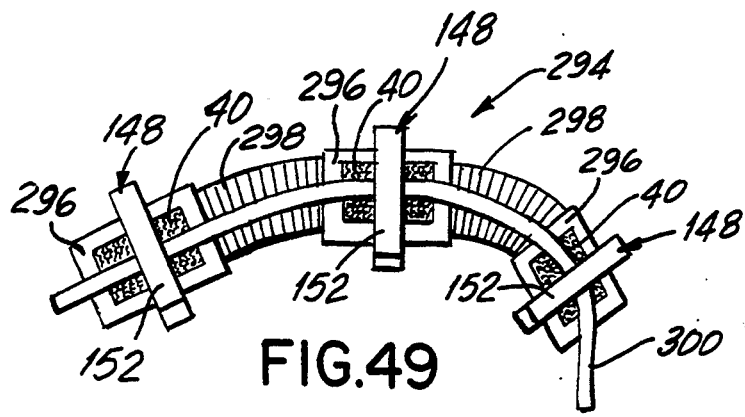
FIG. 49 is a top view showing the mounting means of FIG. 48 in a curved position.

FIG. 49 shows the mounting member 294 having the sections 96 transversely pivoted about the flexible hinges 298 to provide a curved C-shaped arrangement. Furthermore, by way of example, the above-mentioned clip 148, shown in FIG. 22, is secured by the loops of the material portion 136 thereof to the hooks of the material portion 40 disposed on each of the sections 296, so that each section 296 has a clip 148 thereon. Additionally, an elongated longitudinally extending cylindrical member 300, such as a bendable flexible tube, rod, electrical wire and the like, is secured by each of the clips 148 in the above-mentioned manner for securement to the mounting member 294 so that the cylindrical member 300 is maintained in the curved C-shaped arrangement provided by the mounting member 294.

Figure 50:
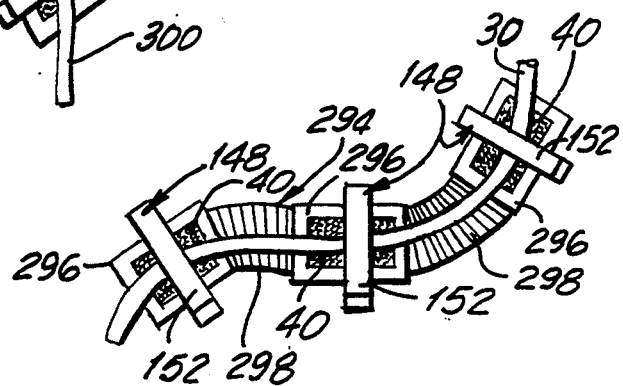
FIG. 50 is a top view showing the mounting means of FIG. 48 in an S-shaped position.

Likewise, FIG. 50 shows the mounting member 294 having the sections 296 transversely pivoted about the flexible hinges 298, first to one side thereof and then to the opposite side thereof, to provide a curved S-shaped arrangement. Accordingly, the clips 148 are secured to the sections 296 by the engagement of the material portions 136 to the material portions 40, in the same manner as shown in FIG. 49. Thus, the elongated longitudinally extending cylindrical member 300 is secured by each of the clips 148 for securement to the mounting member 294 so that the cylindrical member 300 is now maintained in the curved S-shaped arrangement provided by the mounting member 294. It is understood, that the material portions 42 on each of the sections 296 are used to secure the mounting member 294 to an article, in the manner mentioned above, to maintain the C-shaped arrangement shown in FIG. 49 and the S-shaped arrangement shown in FIG. 50. Accordingly, examples of securing the mounting member 294 to articles are set forth below.

Figure 51:
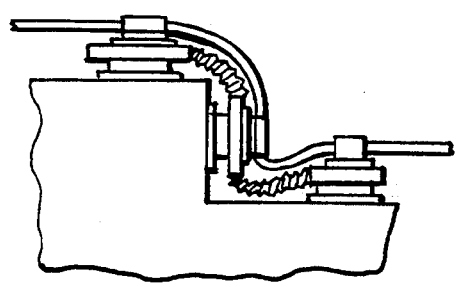
FIG. 51 is a side view showing the mounting means of FIG. 48 mounted on a step.

FIG. 51 shows an article 302, such as a staircase, having an upper step 304 and a lower step 306 connected by a vertical portion 308. Accordingly, the above-mentioned fabric strips 18 are first secured in predetermined positions on the upper step 304, the lower step 306, and the vertical portion 308 by conventional means, such as an adhesive, cement and the like. The material portions 42 on the lower surfaces of the sections 296 of the mounting member 294 are then secured to associated ones of the fabric strips 18 in the manner mentioned above, so that the mounting member 294 is secured to the staircase 302. It is noted, that the flexible hinges 298 permit the mounting member 294 to first be pivoted downwardly from the first step 304, and then pivoted outwardly to lay on the second step 306, as shown in FIG. 51. Thus, the cylindrical member 300, which is secured to the clips 148, is maintained in position conforming to the step arrangement. Obviously, additional sections 296 can be added to the mounting member 294, or additional mounting members 294 can be mounted on the staircase 302, if it is desired to have the cylindrical member 300 extend down the length of the staircase 302.

Figure 52:
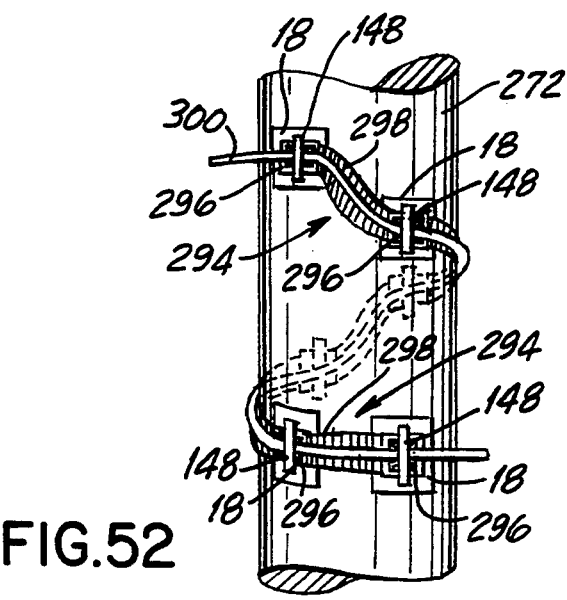
FIG. 52 is a fragmented side view showing a pair of the mounting means of FIG. 48 mounted on a round article.

Likewise, FIG. 52 shows two mounting members 294 secured around the above-mentioned rod, pole or post 272. Accordingly, the above-mentioned fabric strips 18 are first secured in predetermined spaced apart positions around the post 272 by conventional means as mentioned above. The material portions 42 on the lower surfaces of the sections 296 of both mounting members 294 are then secured to associated ones of the fabric strips 18 in the manner mentioned above, so that the two mounting members 294 are secured to the post 272. It is noted, that the flexible hinges 298 permit each of the mounting members 294 to be pivoted in the required manner around the outer surface of the post 272 so that the material portions 42 can engage associates ones of the fabric strips 18. Thus, the cylindrical member 300, which is secured by the clips 148 mounted on the mounting members 294, is maintained in position around the post 272. Obviously, additional sections 296 can be added to one mounting member 294 to elongate same so that only one mounting member 294 is required, rather than using the two mounting members 294 shown in FIG. 52.

It is noted, as indicated above, that rather than securing the clip 148 to the mounting member 294, any of the above-mentioned items can be secured to the mounting member 294 in the same manner. Furthermore, any of the above-mentioned items can be secured to one or more of the sections 296 in either a removable manner or in a one piece integral construction therewith, as indicated above.

Numerous alterations of the above structures herein disclosed will suggest themselves to those skilled in the art. However, it is to be understood that the present disclosure relates to preferred embodiments of the invention which are for purposes of illustration only, and are not to be construed as a limitation of the invention.

What is claimed is:

1. Mounting means for removably securing conventional items, including compasses, pedometers, pouches, purses, cases, watches, clips, holding members and flashlights, to support articles, including clothing, footwear, parts of a person's body, posts, steps and moldings, where the support articles have convex, concave or stepped surfaces, comprising:

a mounting member including at least a central section and two longitudinally opposing end sections arranged in a one piece integral construction;

hinge means transversely disposed across said mounting member between each of said sections to permit said end sections to pivot both upwardly and downwardly relative to said central section to conform to an associated convex, concave or stepped surface of the support article;

first fastener means for removably securing at least one conventional item to one side of said mounting member;

second fastener means for removably securing an opposite side of said mounting member to the support article; and said hinge means being transversely extending recesses provided on said one side of said mounting member between said sections, and associated corresponding transversely extending recesses provided on said opposite side of said mounting member between said sections.

2. Mounting means according to claim 1, wherein said first fastener means include cooperating loop and hook engaging portions disposed on an upper surface of said central section and on an associated facing surface of the item.

3. Mounting means according to claim 1, wherein an outer surface of the item is concavely curved inwardly and has hook engaging portions thereon to provide holding means for retaining flashlights and tennis balls.

4. Mounting means according to claim 1, wherein said first fastener means are secured at least to an upper surface of one of said end sections, and said second fastener means are secured to a lower surface of the opposite one of said end sections, said first and second fastener means being removably secured together so that said mounting member is disposed around the support article.

5. Mounting means according to claim 4, wherein said first fastener means are secured to an upper surface of numerous ones of said sections for removably securing numerous items to said mounting member.

6. Mounting means according to claim 1, wherein said first fastener means include cooperating loop and hook engaging portions.

7. Mounting means according to claim 1, wherein said second fastener means include cooperating loop and hook engaging portions.

8. Mounting means according to claim 1, wherein said first fastener means are secured to an upper surface of numerous ones of said sections.

9. Mounting means according to claim 8, wherein said first fastener means include clips.

10. Mounting means according to claim 1, wherein said second fastener means are secured to a lower surface of at least one of said sections.

11. Mounting means according to claim 1, wherein said second fastener means are secured to a lower surface of numerous ones of said sections.

12. Mounting means for removably securing conventional items, including compasses, pedometers, pouches, purses, cases, watches, clips, holding members and flashlights, to support articles, including clothing, footwear, parts of a person's body, posts, steps and moldings where the support articles have convex, concave or stepped surfaces, comprising:

a mounting member including at least a central section and two longitudinally opposing end sections arranged in a one piece integral construction;

hinge means transversely disposed across said mounting member between each of said sections to permit said end sections to pivot both upwardly and downwardly relative to said central section to conform to an associated convex, concave or stepped surface of the support article;

at least one of said conventional items being disposed on an upper surface of at least one of said sections in an integral construction on one side of said mounting member;

fastener means for removably securing an opposite side of said mounting member to the support article; and said hinge means being transversely extending recesses provided on said one side of said mounting member between said sections, and associated corresponding transversely extending recesses provided on said opposite side of said mounting member between said sections.

13. Mounting means according to claim 12, wherein said fastener means include cooperating loop and hook engaging portions disposed on said lower surface of each of said sections and on an associated facing surface of the support article.

14. Mounting means according to claim 12, wherein an outer surface of said item is concavely curved inwardly and has hook engaging portions thereon to provide holding means for retaining flashlights and tennis balls.

15. Mounting means according to claim 12, wherein said item includes a socket portion integrally secured to said upper surface of said one section, said item also including a flashlight having a ball on one end thereof opposite a light emitting end of said flashlight, said ball being movably captured within said socket portion to provide a universal joint so that said flashlight can be pivoted up, down and sideways relative to said one section of said mounting member.

16. Mounting means according to claim 12, wherein a fastener member is secured at least to an upper surface of one of said end sections, and said fastener means are secured to a lower surface of the opposite one of said end sections, said fastener member and said fastener means being removably secured together so that said mounting member is disposed around the support article.

17. Mounting means according to claim 16, wherein fastener members are secured to an upper surface of numerous ones of said sections for removably securing numerous items to said mounting member.

18. Mounting means according to claim 12, wherein fastener members are secured to an upper surface of numerous ones of said sections.

19. Mounting means according to claim 12, wherein said fastener means are secured to a lower surface of at least one of said sections.

20. Mounting means according to claim 12, wherein said fastener means are secured to a lower surface of numerous ones of said sections.

21. Mounting means according to claim 12, wherein said fastener means include cooperating loop and hook engaging portions.

* * * * *